US008369658B2

(12) United States Patent
Knights et al.

(10) Patent No.: US 8,369,658 B2

(45) Date of Patent: Feb. 5, 2013

(54) OPTICAL MODULATORS EMPLOYING CHARGE STATE CONTROL OF DEEP LEVELS

(76) Inventors: Andrew P. Knights, Hamilton (CA); Gregory L. Wojcik, Ben Lomond, CA (US); Andreas Goebel, Mountain View, CA (US); Dylan F. Logan, Hamilton, CA (US); Paul E. Jessop, Hamilton, CA (US)

( * ) Notice: Subject to any disclaimer, the term of this patent is extended or adjusted under 35 U.S.C. 154(b) by 321 days.

(21) Appl. No.: 12/839,739

(22) Filed: Jul. 20, 2010

(65) Prior Publication Data

US 2011/0091146 A1 Apr. 21, 2011

Related U.S. Application Data

(60) Provisional application No. 61/226,830, filed on Jul. 20, 2009.

(51) Int. Cl.
*G02F 1/035* (2006.01)

(52) U.S. Cl. .................. 385/2; 385/1; 385/14; 385/131; 385/132; 385/140

(58) Field of Classification Search .................. 385/1, 2, 385/3, 14, 31, 40, 129, 130, 131, 132, 140, 385/141

See application file for complete search history.

(56) References Cited

U.S. PATENT DOCUMENTS

| | | | | |
|---|---|---|---|---|
| 6,921,925 | B2 * | 7/2005 | Kish et al. | 257/96 |
| 7,075,165 | B2 * | 7/2006 | Leon et al. | 257/458 |
| 7,122,846 | B2 | 10/2006 | Kish, Jr. et al. | |
| 7,142,342 | B2 * | 11/2006 | Bour et al. | 359/244 |
| 7,386,207 | B2 * | 6/2008 | Knights et al. | 385/40 |
| 2003/0026531 | A1 | 2/2003 | Deliwala | |
| 2003/0147574 | A1 | 8/2003 | Lam et al. | |
| 2004/0240025 | A1 | 12/2004 | Bour et al. | |
| 2005/0051767 | A1 * | 3/2005 | Leon et al. | 257/19 |
| 2006/0039666 | A1 * | 2/2006 | Knights et al. | 385/129 |
| 2007/0018270 | A1 * | 1/2007 | Leon et al. | 257/458 |
| 2007/0147724 | A1 | 6/2007 | Ishizaka | |
| 2009/0003841 | A1 | 1/2009 | Ghidini et al. | |
| 2011/0091146 | A1 * | 4/2011 | Knights et al. | 385/2 |

OTHER PUBLICATIONS

International Search Report issued for PCT/US10/42572, dated Oct. 28, 2010 (2 pages).
A. P. Knights et al. "Silicon-on-insulator waveguide photodetector with self-ion-implantation engineered-enhanced infrared response." J. Vac. Sci. Technol . A24, 783-786 (2006).
M. W. Geis et al. "CMOS-compatible all-Si high-speed waveguide photodiodes with high responsivity in near-infrared communication band." IEEE Photonics Tech. Lett. 19, 152-154 (2007).
Y. Liu et al. "In-line channel power monitor based on Helium ion implantation in silicon-on-insulator waveguides." IEEE Photonics Tech. Lett. 18, 1882-1884 (2006).
H. Y. Fan and A. K. Ramdas "Infrared absorption and photoconductivity in irradiated silicon." J. Appl. Phys. 30, 1127-1134 (1959).

(Continued)

*Primary Examiner* — Brian Healy
(74) *Attorney, Agent, or Firm* — Wilmer Cutler Pickering Hale & Dorr LLP

(57) ABSTRACT

A method involving: providing an optical waveguide made of a semiconductor material and having a region that is doped by a deep level impurity which creates deep level states in a bandgap in the semiconductor material, the deep level states characterized by an occupancy; passing an optical signal through the optical waveguide and between the region doped by the deep level impurity; and modulating the occupancy of the deep level states to thereby modulate the optical signal.

21 Claims, 7 Drawing Sheets

OTHER PUBLICATIONS

G. J. Parker et al. "Measurement of concentration and photoionization cross section of indium in silicon." J. Appl. Phys. 54, 3926-3929 (1983).

M. J. Keevers & M. A. Green "Efficiency improvements of silicon solar cells by the Impurity photovoltaic effect." J. Appl. Phys. 75, 4022-4031(1994).

P. J. Foster et al. "Optical attenuation in defect-engineered silicon rib waveguides." J. Appl. Phys. 99, 073101-1-7 (2006).

A. Sato et al. "Determination of Solid Solubility Limit of In and Sb in Si using Bonded Silicon-On-Insulator (SOI) Substrate." in *Proc. IEEE 1995 Int. Conf. on Microelectronic Test Structures*. (Nara, Japan, vol. 8, 1995) pp. 259-263.

J. Liu et al. "Investigation of Indium Activation by C-V Measurement." in *Proc. IEEE Int. Conf. on Ion Implantation Technology*, H. Ryssel et al., ed. (Alpbach, Austria, 2000) pp. 66-69.

* cited by examiner

OPTICAL MODULATORS EMPLOYING CHARGE STATE CONTROL OF DEEP LEVELS

This application claims the benefit of U.S. Provisional Application No. 61/226,830 filed Jul. 20, 2009, the contents of which are incorporated herein by reference.

TECHNICAL FIELD

This invention relates generally to optical modulation and semiconductor waveguides in which optical modulation is used.

BACKGROUND OF THE INVENTION

Optical detection via defect-enhanced carrier generation in SOI ridge waveguides is now established as a viable method for sub-bandgap optical to electrical conversion. (See: A. P. Knights et al. "Silicon-on-insulator waveguide photodetector with self-ion-implantation engineered-enhanced infrared response." J. Vac. Sci. Technol. A24, 783-786 (2006); M. W. Geis et al. "CMOS-compatible all-Si high-speed waveguide photodiodes with high responsivity in near-infrared communication band." IEEE Photonics Tech. Lett. 19, 152-154 (2007); and Y. Liu et al. "In-line channel power monitor based on Helium ion implantation in silicon-on-insulator waveguides." IEEE Photonics Tech. Lett. 18, 1882-1884 (2006).) In the previously reported work, defects are introduced into the waveguide through ion implantation (with or without a post-implantation thermal anneal), which increases the optical absorption for wavelengths around 1550 nm through the (essentially) mid-gap divacancy or interstitial cluster level (see, H. Y. Fan and A. K. Ramdas "Infrared absorption and photoconductivity in irradiated silicon." J. Appl. Phys. 30, 1127-1134 (1959)). Integrated p-i-n diode structures are used to extract the optically generated carriers from the device volume supporting the optical mode, thus allowing for signal detection directly from the waveguide. The degree of absorption may be changed by varying the concentration of defects, and thus the amount of signal that is sampled may be varied from a few percent to virtually the entire signal. As a result, defect-enhanced photodetectors may be implemented as both in-line power monitors and as end-of-line signal detectors. Their potential advantages over competing technologies rely on the fact that they are fabricated entirely using standard silicon processing methods and do not involve hybrid integration or the hetero-growth of germanium.

The photodetectors reported to date are fabricated in the intrinsic (or low-doped) silicon overlayer of a silicon-on-insulator (SOI) structure, and therefore the influence of background dopant concentration on device performance has not been studied. In the case of carrier generation via the divacancy defect, the background dopant concentration will affect the charge state of the divacancies, which in turn will influence the defect mediated absorption. Evidence consistent with this postulate has been reported previously (see, C. S. Chen & J. C. Corelli "Infrared spectroscopy of divacancy-associated radiation-induced absorption bands in silicon." Phys. Rev. B 5, 1505-17 (1972)), and has recently been demonstrated using a waveguide geometry (see, D. Logan et al. "The effect of doping type and concentration on optical absorption via implantation induced defects in silicon-on-insulator waveguides." in *COMMAD* 2008 *IEEE Proc. Conf. on Optoelectronic and Microelectronic Materials and Devices*. (Sydney, Australia, 2008). pp. 152-5).

The divacancy has a deep-level situated in the band gap at Ec-0.4 eV and as such, light at a wavelength of 1550 nm may cause charge excitation from the valence band or from the deep-level to the conduction band, albeit at significantly different rates (see, E. Simoen et al. "Impact of the divacancy on the generation-recombination properties of 10 MeV proton irradiated Float-Zone silicon diodes." Nucl. Instruments and Methods in Physics Research A. 439, 310-318 (2000)). The variation in cross-section for these two processes results in a measurable difference in absorption coefficient as background doping type and concentration is changed, but there is no doping concentration at which the absorption coefficient related to the defect is reduced to zero (see, Logan, supra.).

SUMMARY OF THE INVENTION

A deep level which is positioned in the bandgap such that either the valence band to deep-level, or the deep-level to the conduction band transition is greater than 0.8 eV provides an absorption mechanism which may be reduced to a negligible amount via variation of the deep-level charge state. Doping silicon with indium provides just such a deep-level because indium is well known to have a single acceptor level at 157 meV above the valence band. Strong absorption may be expected when in the neutral charge state (through hole generation), but not when the associated level is in the negative charge state (the threshold wavelength equivalent for such a transition is approximately 1320 nm). Of significance, a large shift in absorption in response to a change in defect charge state is relevant to active devices, where the occupancy may be altered by injecting or removing carriers. In this application, we present results which exhibit the strong variation in absorption of 1550 nm light via indium doping in SOI waveguides through the variation of background n-type doping. We also describe device structures in which such a mechanism is used to provide broadband, polarization independent variable attenuation and demonstrate that such devices are significantly more efficient than those of equivalent dimension which rely on free carrier absorption effects alone.

In general, in one aspect, the invention features a circuit including: an optical waveguide made of a semiconductor material; a variable optical attenuator formed over a predefined region of the optical waveguide; and a modulating circuit electrically connected to the variable optical attenuator. The variable optical attenuator includes: a p-type region on one side of the optical waveguide; an n-type region on another side of the optical waveguide and aligned with the p-type region; and a deep level impurity doping the semiconductor material in the optical waveguide in a region that is between the p-type region and the n-type region, wherein the deep level impurity creates states in a bandgap in the semiconductor material. The modulating circuit during operation applies a modulated voltage across the variable optical attenuator to thereby control an occupancy of the deep level states created by the deep level impurity.

Other embodiments include one or more of the following features. The circuit also includes a substrate on which the optical waveguide in the form of a ridge waveguide is fabricated. The optical modulator also includes a co-dopant in the optical waveguide in a region that is between the p-type region and the n-type region for increasing the occupancy of the deep level states. The modulating circuit is configured to modulate either a reverse bias across the variable optical modulator or a forward bias across the variable optical modulator, depending on whether the variable optical modulator is a depletion type device or an injection type device. The deep level impurity is indium; the semiconductor is silicon; and the co-dopant is phosphorus.

In general, in another aspect, the invention features a circuit including: an optical waveguide made of a semiconductor material; a p-type region on one side of the optical waveguide; an n-type region on another side of the optical waveguide and aligned with the p-type region; a deep level impurity doping the semiconductor material in the optical waveguide in a region that is between the p-type region and the n-type region for creating deep level states in a bandgap in the semiconductor material; and a modulating circuit electrically connected to p-type and n-type regions to modulate a bias between the p-type and n-type regions thereby controlling an occupancy of the deep level states created by the deep level impurity.

In general, in yet another aspect, the invention features a method involving: providing an optical waveguide made of a semiconductor material and having a region that is doped by a deep level impurity for creating deep level states in a bandgap in the semiconductor material; passing an optical signal through the optical waveguide and between the region doped by the deep level impurity; and modulating the occupancy of the deep level states to thereby modulate the optical signal.

Other embodiments include one or more of the following features. The modulating involves either injecting free-carriers into the region doped by the deep level impurity or depleting free-carriers from the region doped by the deep level impurity, depending on whether the device is an injection device or a depletion device. The modulating involves a variable forward bias voltage or reverse bias between the p-type region and the n-type region.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
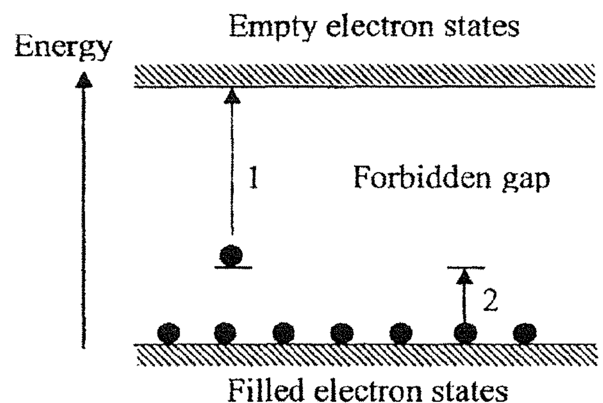
FIG. 1 illustrates the electronic band structure of a semiconductor material.

Referring to FIG. 1, in a semiconductor material, such as silicon, the electronic properties are modeled by assuming there exists a bandgap, bounded by two energy regions of electron states (or bands) known as a valence band 10 and a conduction band 20. The bandgap has no allowed electron states.

By incorporating a small quantity of another element (a dopant or impurity) into the structure of the silicon, a single electronic state 30 is produced within the forbidden energy bandgap. Electrons are capable of moving to and from this single state to the surrounding energy regions (conduction and valence bands) by various mechanisms, one of which is through the absorption of a photon (this process is known as an optical transition).

If the electronic state within the forbidden gap is occupied by an electron, the only optical transition permitted is from this state to the empty electron states (conduction band) above (process 1 in the diagram). Alternatively, if the electronic state is not occupied by an electron, the optical transition is from the filled electron states (valence band) below to the state in the bandgap (process 2). In general, the optical transition for process 1 and process 2 require different energies.

As it is drawn in the diagram, with the electronic state being closer to the bottom of the forbidden gap, process 2 requires less optical energy than process 1. As a result, for a particular range of light frequencies (which is equivalent to a range of photon energy), process 2 is allowed while process 1 is not. Consider operation at a frequency (or photon energy) within this range. When the electronic state is occupied by an electron, the material will not absorb light as process 1 is forbidden; when the electronic state is not occupied by an electron, the material will absorb light through process 2. Therefore, the absorption of the material is dependent on the occupation of the electronic charge state.

Note that, were the electronic state closer to the top of the forbidden gap, the opposite would be true. That is, a range of frequencies would exist where process 1 is allowed and process 2 is not.

Active control over the optical absorption is possible through active control of the occupation of the electronic state. For instance, the material could be incorporated into a device in which an applied electric field could either inject electrons into or remove electrons from the material, thus changing the average occupation of the electronic states and thereby tuning the optical absorption. This is essentially the modulation mechanism which is the focus of this application, as well as devices derived therefrom.

With this high level description in mind, we will now discuss in greater detail the specific case of indium doped silicon.

Background to Charge State Mediated Absorption

A 4 μm optical absorption resonance exists in indium doped silicon (see, G. J. Parker et al. "Measurement of concentration and photoionization cross section of indium in silicon." J. Appl. Phys. 54, 3926-3929 (1983)). This absorption results from the excitation of an electron from the valence band onto a neutral indium center where it occupies the single negatively charged state lying 157 meV above the valence band. The cross-section for this optically excited transition is approximately $1.7\times10^{-17}$ $cm^2$ for photons with an energy equivalent 1550 nm wavelengths (see, M. J. Keevers & M. A. Green "Efficiency improvements of silicon solar cells by the Impurity photovoltaic effect." J. Appl. Phys. 75, 4022-4031 (1994)). The excitation of an electron from the indium into the conduction band requires a photon energy of 0.94 eV, and therefore has a negligible optical cross-section for 1550 nm photons. The absorption strength for this wavelength is then proportional to the concentration of neutral (unoccupied) indium, which is dependent on the position of the Fermi level. The absorption coefficient of the 4 μm resonant band for 1550 nm can be described as follows:

$$\alpha_d = \sigma_p^{opt}\int_{x,y}\Phi(x, y)(N_t(x, y) - n_t(x, y))dx\,dy; \tag{1}$$

where $\sigma_p^{opt}$ is the cross-section for optical absorption at 1.55 μm wavelength;

$\Phi(x,y)$ is the normalized (unit power) optical mode profile of the waveguide;

$N_t(x,y)$ is the profile of the indium concentration;

$n_t(x,y)$ is the profile of the ionized (negatively charged) indium.

For indium doping alone, the device is p-type and the indium acceptors are partially occupied ($n_t$ is a fraction of $N_t$) and the optical absorption for 1550 nm is maximized. Whereas, for background doping which is n-type the indium acceptors are compensated and thus have an occupation $n_t$ which approaches $N_t$, which degrades the absorption coefficient.

Experimental and Modeled Absorption

Rib waveguides of 4 μm width were fabricated on eleven samples cleaved from 2.5 μm thick silicon overlayer SOI, using a KOH wet etching technique described elsewhere (e.g. see, P. J. Foster et al. "Optical attenuation in defect-engineered silicon rib waveguides." J. Appl. Phys. 99, 073101-1-7 (2006)). The etch depth was chosen to ensure the resulting waveguide supported single-mode propagation for 1550 nm light. Windows of varying length L (up to a maximum length of 4 mm), centered on each rib, were defined using 4 μm thick photoresist, and used as a mask during ion implantation of indium at 500 keV for doses varying from $1\times10^{13}$ to $6\times10^{14}$ $cm^{-2}$. The samples were then cleaned of the resist mask and annealed at 1000 C in dry $O_2$ for 50 minutes. Eight of the unmasked samples were subsequently ion implanted with phosphorus at an energy of 175 keV at doses ranging from $6\times10^{12}$ to $2\times10^{14}$ $cm^{-2}$, and annealed at 1000 C in dry $O_2$ for a further 150 minutes. These implantation and thermal processes were designed to position the resulting indium and phosphorus concentration profiles coincidentally, with a peak concentration at ~1 μm. The concentration of the indium and phosphorus doping at their peak of the profiles are provided in Table I, below.

The unmasked phosphorus implantation contributes to free-carrier absorption over the entire waveguide length W, while the masked indium implant contributes to absorption over the window length L, only. Therefore, the total loss measured for each waveguide has the following form:

$$\text{Total Loss (dB)}=\alpha_d L+\alpha_i W+c \tag{2}$$

where $\alpha_d$ is the absorption coefficient of the indium center from eqn. (1);

L is the length of the indium implantation window;

$\alpha_i$ is the intrinsic absorption coefficient (which includes enhanced free carrier absorption consequent from phosphorus doping);

W is the entire length of the waveguide; and c is the coupling loss.

Laser light close to 1550 nm in wavelength was coupled into each waveguide through a tapered optical fibre, and the transmitted light collected by an objective lens and focused onto a free-space InGaAs photodetector.

Figure 2:
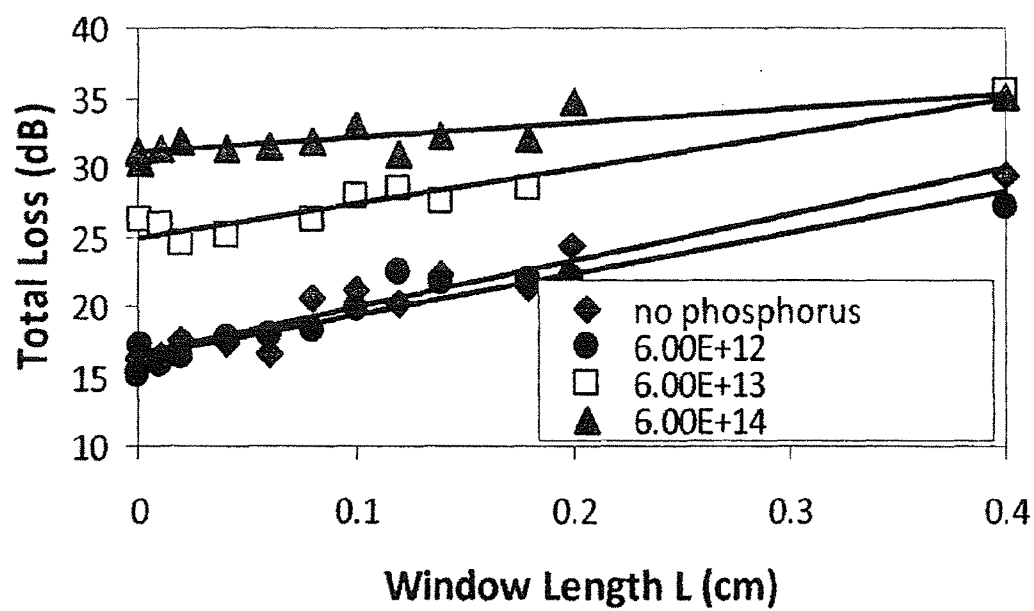
FIG. 2 presents example plots of total loss measured for each waveguide for a chip with indium implanted at a dose of $6\times10^{14}$ cm$^{-2}$ and with the various phosphorus doses also indicated. A fit to the data using Eqn. (2) provides $\alpha_d$ (the slope of the line), which is observed to decrease with increasing phosphorus dose.
Figure 3:
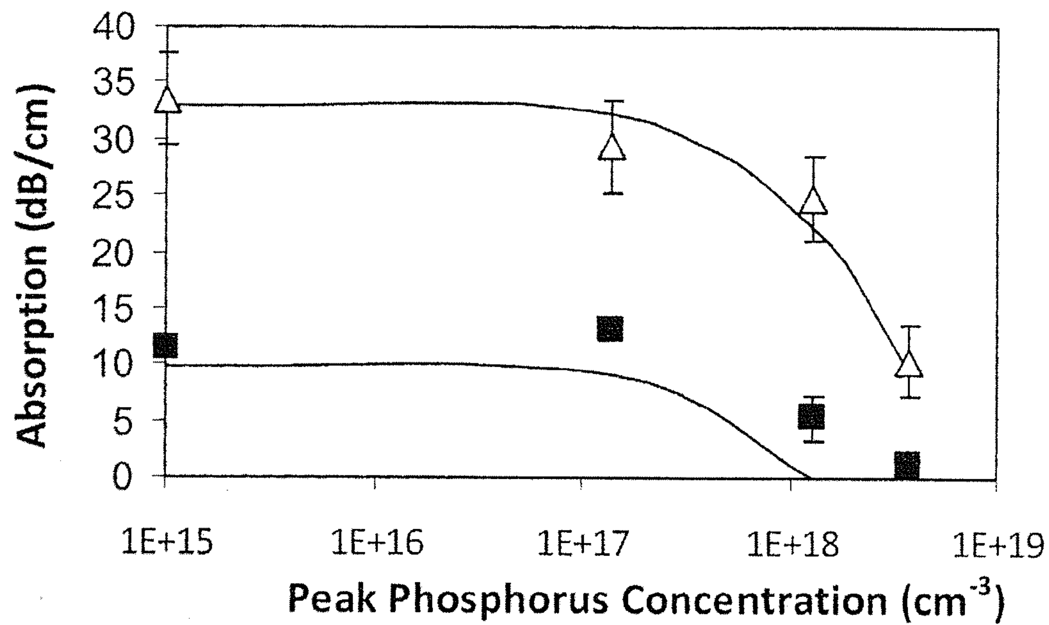
FIG. 3 shows a plot of extracted values of $\alpha_d$ vs. peak phosphorus concentration for all samples with indium implanted to a dose of $6\times10^{13}$ cm$^{-2}$ (black squares) and $6\times10^{14}$ cm$^{-2}$ (white triangles), illustrating the significant decrease of $\alpha_d$ resulting from co-doping with phosphorus where the solid lines are fits to the data derived from Eqns. (1) and (3).

The measured variation in the total loss between waveguides on a single sample is due to the variation in L (the waveguides have constant length W). The value of $\alpha_d$ can be extracted from a fit to the total loss vs. L, examples of which are shown in FIG. 2. The summary of variation in indium and phosphorus doping for each sample and the measured $\alpha_d$ is provided in Table I and plotted in FIG. 3.

| Indium | | Phosphorus | | | |
|---|---|---|---|---|---|
| Implanted Dose ($cm^{-2}$) | Peak Concentration ($cm^{-3}$) | Implanted Dose ($cm^{-2}$) | Peak Concentration ($cm^{-3}$) | Measured Loss (dB/cm) | Modeled Loss (dB/cm) |
| $10^{13}$ | $1.7\times10^{17}$ | $6\times10^{13}$ | $1.3\times10^{18}$ | −0.17 +/− 3.87 | 0.00 |
| $10^{13}$ | $1.7\times10^{17}$ | $6\times10^{12}$ | $1.4\times10^{17}$ | 1.86 +/− 0.93 | 0.45 |
| $10^{13}$ | $1.7\times10^{17}$ | — | — | 2.58 +/− 0.62 | 1.09 |
| $6\times10^{13}$ | $10^{18}$ | $2\times10^{14}$ | $3.7\times10^{18}$ | 1.18 +/− 0.33 | 0.00 |
| $6\times10^{13}$ | $10^{18}$ | $6\times10^{13}$ | $1.3\times10^{18}$ | 5.28 +/− 2.03 | 0.31 |
| $6\times10^{13}$ | $10^{18}$ | $6\times10^{12}$ | $1.4\times10^{17}$ | 13.09 +/− 1.03 | 9.16 |
| $6\times10^{13}$ | $10^{18}$ | — | — | 11.56 +/− 1.06 | 9.91 |
| $6\times10^{14}$ | $1.5\times10^{18}$ | $2\times10^{14}$ | $3.7\times10^{18}$ | 10.37 +/− 3.18 | 9.42 |
| $6\times10^{14}$ | $1.5\times10^{18}$ | $6\times10^{13}$ | $1.3\times10^{18}$ | 24.77 +/− 3.67 | 22.16 |
| $6\times10^{14}$ | $1.5\times10^{18}$ | $6\times10^{12}$ | $1.4\times10^{17}$ | 29.41 +/− 4.11 | 32.26 |
| $6\times10^{14}$ | $1.5\times10^{18}$ | — | — | 33.51 +/− 4.07 | 33.04 |

The modeled optical loss shown in the far right column of Table I is derived from the overlap integral of Eqn. (1). Using the implantation conditions given above the dopant concentration profiles were simulated using. The optical cross-section for excitation of an electron from the valence band to the unoccupied indium level, $\sigma_p^{opt}$, was assumed to be $1.7\times10^{-17}$ $cm^2$ (see Keevers, supra). The optical mode profile $\Phi(x,y)$ was obtained from commercially available beam propagation software.

The indium occupation $n_t(x,y)$ was calculated by assuming 100% activation of phosphorus (with a concentration $N_d$), and numerically solving $$e + n_t = \frac{n_i^2}{e} + N_d,\ \frac{n_t}{N_t} = \frac{c_n e + c_p p'}{c_n(n' + e) + c_p(p' + n_i^2/e)} \tag{3}$$

for $n_t$ and e at each point (x, y), where:

e is electron concentration, $c_n$ and $c_p$ are capture rates of electrons and holes for indium, n' and p' are related to the indium level's position in the band gap (see, Dieter K. Schroder, *Semiconductor Material and Device Characterization*. (John Wiley & Sons, 2006). p. 255-8).

Figure 4:
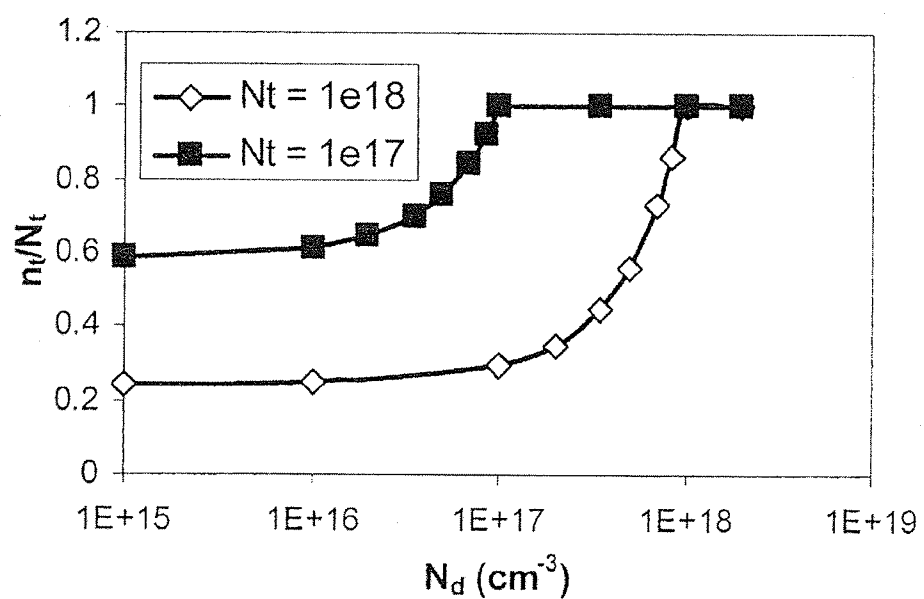
FIG. 4 shows the occupation fraction of indium vs. donor concentration $N_d$ for $N_t=10^{17}$ cm$^{-3}$ and $10^{18}$ cm$^{-3}$.

For example, the calculated $n_t/N_t$ is plotted in FIG. 4 for $N_t=10^{17}$ $cm^{-3}$ and $10^{18}$ $cm^{-3}$ for varying values of $N_d$.

The results in Table I indicate that the variation in occupation of the indium dopant caused by the presence of shallow donor atoms manifests as a variation in optical absorption. We note that while the largest indium implantation dose would be expected to produce a peak indium concentration of $6\times10^{18}$ $cm^{-3}$, and therefore an absorption in the region of 130 dB/cm, the activated indium concentration is limited by the solid solubility of indium in silicon. This solid solubility has been determined previously to be $1.4\text{-}1.5\times10^{18}$ $cm^{-3}$, for an activation temperature of 1000 C which limits the accessible absorption (see, A. Sato et al. "Determination of Solid Solubility Limit of In and Sb in Si using Bonded Silicon-On-Insulator (SOI) Substrate." in *Proc. IEEE* 1995 *Int. Conf. on Microelectronic Test Structures*. (Nara, Japan, vol. 8, 1995) pp. 259-263; and J. Liu et al. "Investigation of Indium Activation by C-V Measurement." in *Proc. IEEE Int. Conf on Ion Implantation Technology*, H. Ryssel et al., ed. (Alpbach, Austria, 2000) pp. 66-69). This effect has been taken into account also in the modeling. Implicit is that indium which is not activated does not support electronic excitation.

The phenomenon described above can be used to produce a modulation effect in a silicon waveguide. A modulator may function by varying $n_t$ (the number of occupied indium acceptors) over a large range to vary $\alpha_d$ as described in Eqn. (1). For example, if a concentration of indium centres, $N_t$, is introduced into a waveguide with negligible background doping, $n_t$ will be a small fraction of $N_t$ (controlled by the electrical activation of indium) and $\alpha_d$ will be a maximum. Subsequent application of an electric field to the waveguide would then cause a depletion effect with the result that holes would be emitted from the indium centres, increasing $n_t$ and decreasing the absorption to a minimum level. Alternatively, if $N_t$ indium centers are introduced into a waveguide which is co-doped with shallow donors (such as phosphorus atoms) to a concentration of $N_d$, such that $N_d \geqq N_t$, the indium dopant will be fully compensated with the result that $n_t=N_t$ (as in FIG. 3) so that minimum absorption occurs. These approaches are subsequently referred to as the depletion or injection methods.

Simulations were performed using the commercial software. A silicon waveguide structure shown schematically in FIG. 5 was described in the Deckbuild environment and electronic levels, having the characteristics of the indium center, were added into the entire overlayer region of the SOI. The $p^+$ and $n^+$ regions correspond to doping levels of $10^{18}$ $cm^{-3}$ and the $p^{++}$ and $n^{++}$ regions correspond to doping levels of $10^{19}$ $cm^{-3}$ The structure was subsequently modeled for electrical performance using ATLAS. For each bias condition, the two-dimensional profile of the ionized acceptor trap density, $n_t(x, y)$, was determined. The normalized optical mode profile $\Phi(x,y)$, obtained from the waveguide propagation simulator BeamPROP, was used to calculate the overlap integral of Eqn. (1). As a result, it was possible to acquire $\alpha_d$ as a function of electrical bias applied to the device. This was also incorporated into a transient simulation, whereby $\alpha_d$ was computed at various time intervals following bias application in order to determine the bandwidth of the device.

Figure 5:
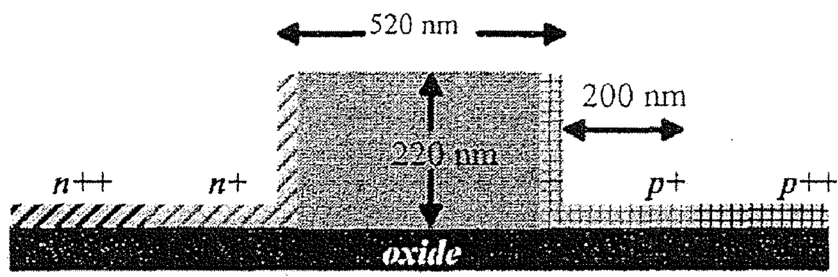
FIG. 5 is a cross-sectional view of the device modeled in the study described herein.

The device used for this study, shown in FIG. 5, utilises a low dimensional structure used previously, for example, to form waveguide photodetectors as described by Geis et al. (M. W. Geis et al. "CMOS-compatible all-Si high-speed waveguide photodiodes with high responsivity in near-infrared communication band." IEEE Photonics Tech. Lett. 19, 152-154 (2007), incorporated herein by reference). Both contact regions are in close proximity to the optical mode, which is beneficial in that any carrier depleted volume or injected hole distribution overlaps strongly with the optical mode.

Figure 6:
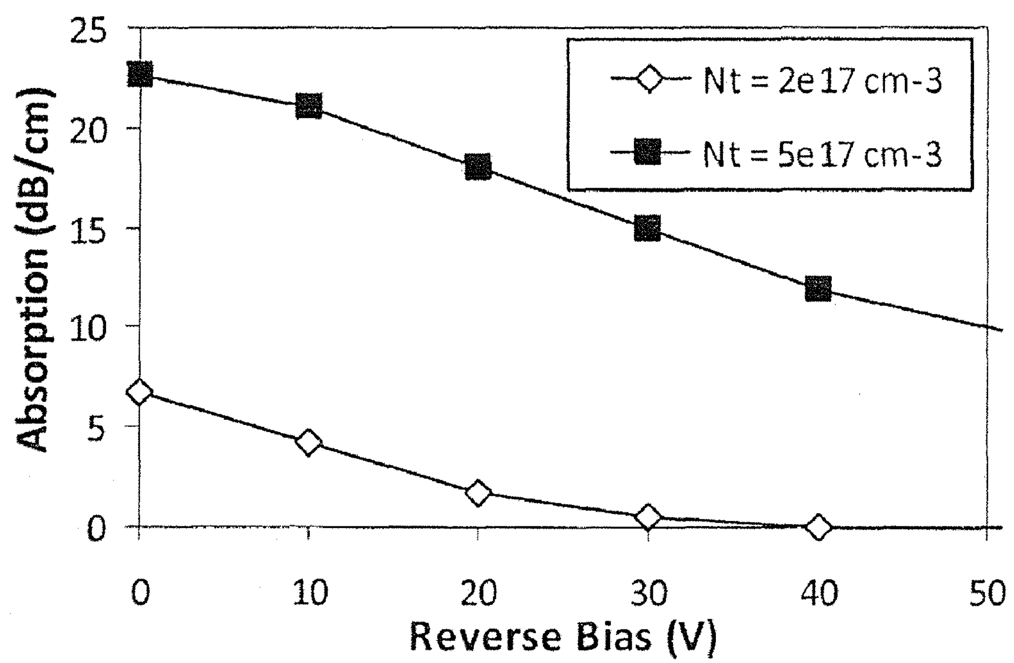
FIG. 6 shows the absorption coefficient $\alpha_d$ plotted as a function of applied reverse bias for two uniform indium concentrations, $N_t$.

The Depletion Method:

A limitation of the depletion method when applied to the device structure shown in FIG. 5 is that it is restricted to relatively small values of indium concentration, $N_t$. The use of high concentrations of indium severely limits the volume of the waveguide that could be depleted. For instance, $\alpha_d$ increases with $N_t$ at a rate given by Eqn. (1), but the bias required to achieve $n_t=N_t$ increases also. To demonstrate this effect, FIG. 6 plots simulated optical absorption as a function of reverse bias for two values of $N_t$. The achievable modulation depth is limited to ~5 dB/cm for a relatively large bias of −20V, while it is difficult to achieve zero loss using the depletion method, even for $N_t=2\times10^{17}$ $cm^{-3}$.

Figure 7:
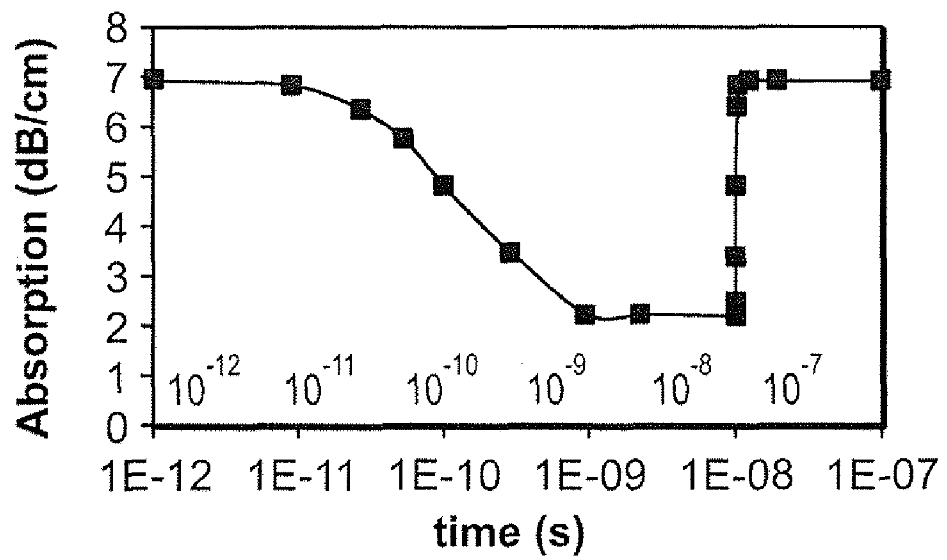
FIG. 7 shows the simulated absorption coefficient following the application of a −20 V bias and then the removal of the bias after 10 ns.

A transient study was also performed using the depletion method. For the case of $N_t=2\times10^{17}$ $cm^{-3}$ the results are shown in FIG. 7. The turn-on time is 0.6 ns, and becomes larger as $N_t$ is increased. The turn-off time is 0.3 ns, and was found to be independent of the value of $N_t$ (for the two values in FIG. 6). There is no significant impact of the magnitude of the reverse bias on the turn-on and turn-off times.

The Injection Method:

Relative to the depletion method, the modulation achievable via carrier injection is considerable. The ability of ionized acceptors to decrease $n_t$ via hole capture is largely dependent on the difference between the capture rates for electrons and holes. For indium the capture cross-section of holes ($8\times10^{-15}$ $cm^2$) is much larger than the capture cross-section for electrons ($2\times10^{-22}$ $cm^2$) (e.g. see Keevers, supra). As a result, the injected holes will be preferentially captured over the injected electrons in a bipolar device. This disparity in carrier trapping rates can be enhanced by placing the p-type contact in a closer proximity to the optical mode than the n-type contact, allowing more holes in the modal volume than electrons. This injection method then can be used as an enhancement to a variable optical attenuator (VOA) which relies on free carrier absorption alone, achieving a significantly larger extinction ratio with a negligible increase in dissipated power.

Figure 8:
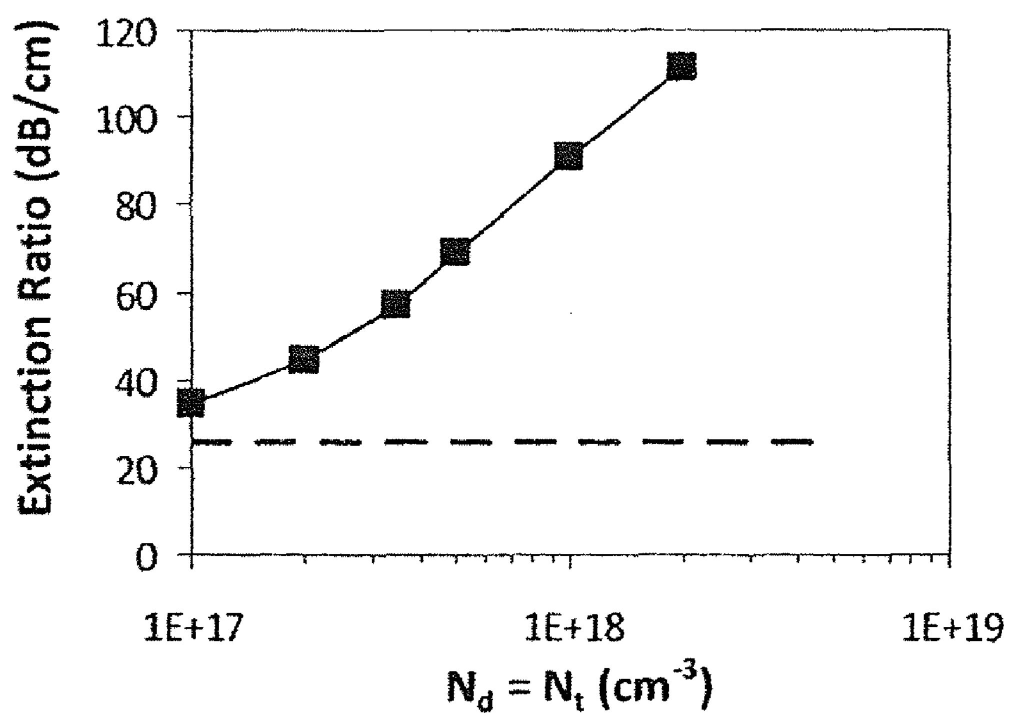
FIG. 8 shows simulated $\alpha_d$ following application of 1 V forward bias to the device as a function of $N_t=N_d$, where the dotted line represents the performance of free-carrier absorption alone.

The simulation results that follow the value of the n-type background doping $N_d$ of the waveguide were fixed such that $N_d=N_t$. The extinction ratio of the modulator will increase with increasing $N_t$. FIG. 8 plots this increase as a function of $N_t$, showing the seemingly unbounded improvement over a modulator without indium and with a background doping concentration of $1\times10^{15}$ $cm^{-3}$ (this is equivalent to a device using free-carrier injection alone to achieve modulation). The limit on modulation improvement will in fact be determined by the solid solubility of indium in the silicon waveguide. For larger devices (on the order of 10 $\mu m^2$ cross-section), the large donor concentrations may limit the penetration of holes into the device cross-section.

In practice, $N_d$ is unlikely to be matched to $N_t$, which may lead to an excess insertion loss. If $N_d>N_t$, the insertion loss will increase due to free carrier absorption; while if $N_t>N_d$, the insertion loss will increase due to absorption from uncompensated indium. Since the optical cross-section for indium absorption is approximately double that for absorption of free electrons, it is preferred to overcompensate the background doping such that $N_d>N_t$, as is the case in the passive loss data described above.

Figure 9:
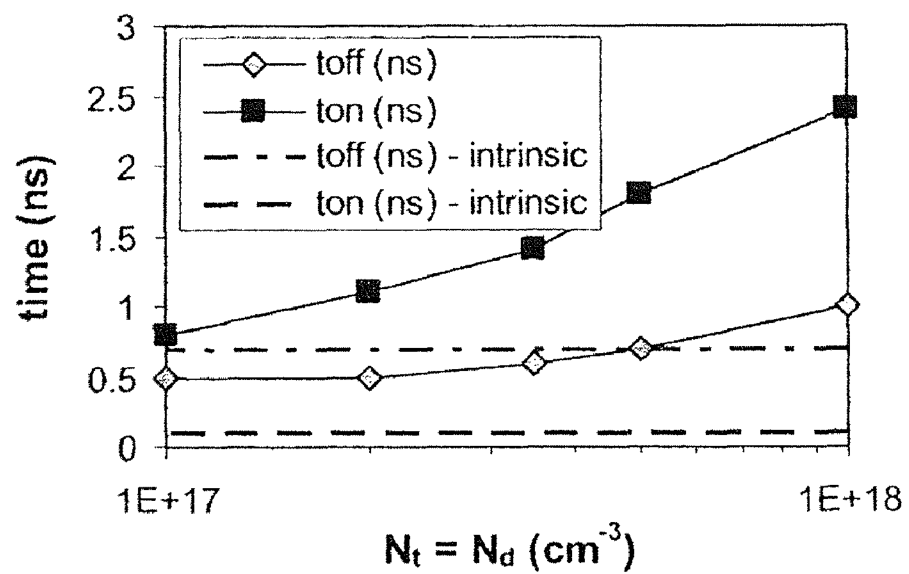
FIG. 9 is a plot of turn-off time ($t_{off}$) and turn-on time ($t_{on}$) as a function of $N_t=N_d$, showing the decrease in device speed concurrent with the increase in absorption.

The turn-on and turn-off times for the injection modulator are plotted as a function of $N_t=N_d$ in FIG. 9. The horizontal lines indicate the turn-on and turn-off times for a device containing no indium and again represents the performance of a device relying on free-carrier absorption alone. In this example, it is clear that the modulation bandwidth is degraded by the introduction of indium, although for indium doping levels $<3\times10^{17}$ $cm^{-3}$, the speed of the device remains close to 1 GHz.

Figure 10:
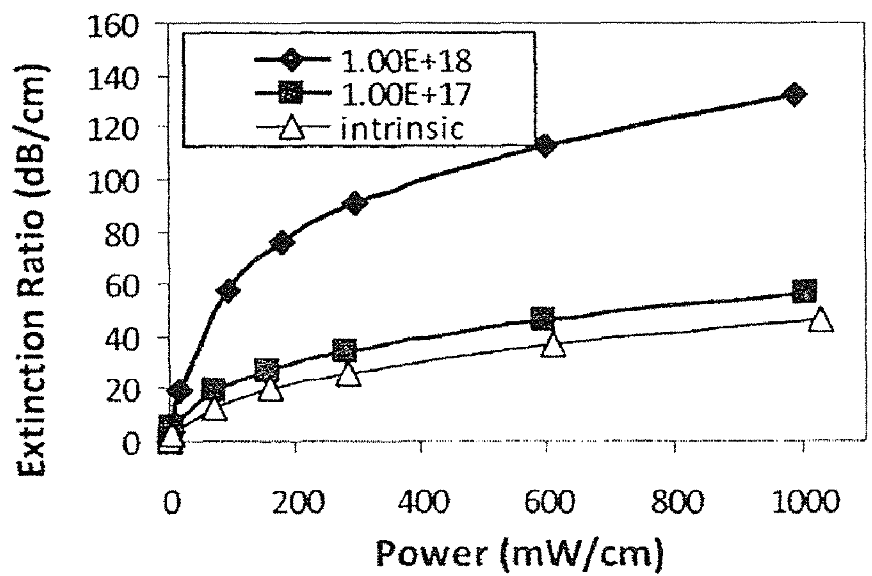
FIG. 10 plots the extinction ratio vs. power (both normalized to length) for the enhanced VOA for two levels of indium doping and compared with the performance of an undoped device operating solely by free-carrier absorption.

The Extinction Ratio vs. Dissipated Power for two indium doping concentrations, one having $N_t=N_d=10^{18}$ $cm^{-3}$ and a second having $N_t=N_d=10^{17}$ $cm^{-3}$, is plotted as FIG. 10, together with that for a device without enhancement from indium absorption.

At $N_t=N_d=10^{17}$ $cm^{-3}$, the enhancement in modulation relative to the undoped device is such that the addition of indium barely compensates for the degradation in absorption from free holes. For $N_t=N_d=10^{18}$ $cm^{-3}$, the increase in absorption is however significant. For example, a device of 1 mm in length would require 40 mW of power to achieve an extinction ratio of 10 dB. Alternatively, a 1 mm VOA using only free-carrier absorption would require approximately 400 mW to achieve a 10 dB extinction ratio.

Assuming the device is sufficiently small, the limiting factor on both extinction ratio and speed is the deep level characteristics, specifically the optical cross-section for excitation of electrons from the valence band to the defect level, $\sigma_p^{opt}$, and the relative capture cross-sections of electrons and holes at the defect level. For instance, the larger the difference in hole and electron cross-sections, the more effective the current injection for changing the occupancy. The speed of the device could be increased by selecting a defect level with larger capture cross-sections of both electrons and holes, while maintaining a significant superiority of holes over electrons for the reasons outlined above.

In summary, doping type and concentration can have an effect on the absorption of deep level defects in silicon waveguides using the indium center as an example. The dependence is correlated with the defect occupancy, which in turn depends on the location of the Fermi level. Defect occupancy can be changed by depleting or injecting a device with charge carriers. This presents a novel means for fabricating a "normally off" VOA device or enhancing more traditional forms of carrier injection VOA operation. Both the speed and modulation depth of a sub-micron cross-sectional device depends primarily on the defect characteristics.

We now described two devices which exploit the above-described mechanism. The first one is a depletion device and the second one is an injection device.

Depletion Device

Figure 11:
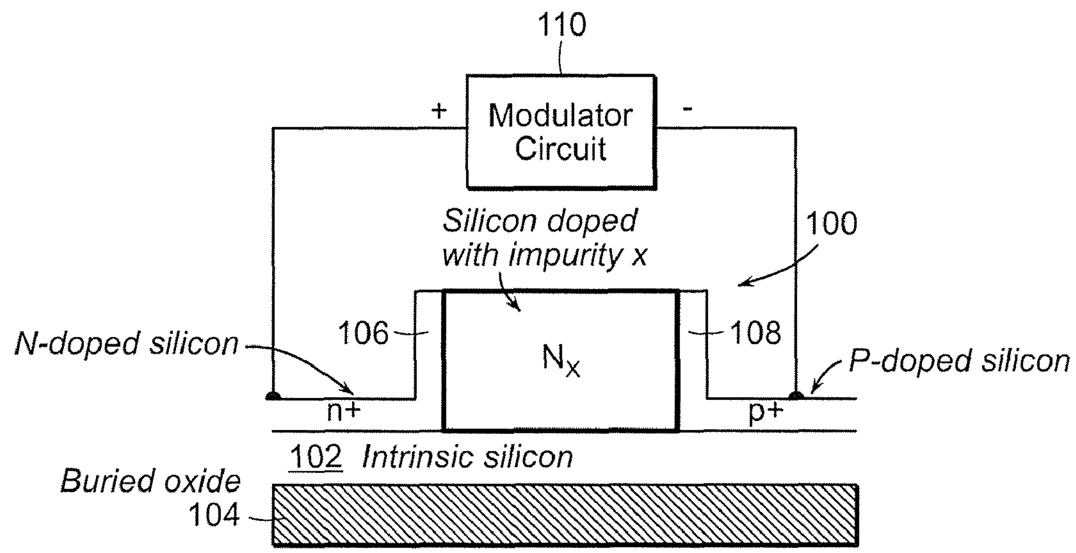
FIG. 11 illustrates a circuit including a depletion device.

FIG. 11 illustrates a silicon-on-insulator (SOI) rib waveguide 100 formed on an intrinsic silicon substrate 102 with an underlying, buried oxide layer 104. The axis of the waveguide is perpendicular to the image. In other words, if the plane of the figure represents the x-y plane, then the waveguide extends in both directions along the z-axis. The view is a cross-sectional view taken at the location of an optical modulator that has been fabricated on the waveguide.

The optical modulator includes a heavily doped n-type region 106 formed over a predefined region on the left side of the waveguide and a heavily doped p-type region 108 formed over a predefined region on the right side of the waveguide and opposite the heavily doped n-type region. These are formed away from the propagating optical mode that travels down the center of the waveguide so that they do not attenuate that mode.

The center region of the waveguide between the two heavily dopes regions is doped with species x to a concentration $N_x$, making it p type. In this case, assume that species x is an acceptor type defect/dopant that is closer to the valence band than the conduction band (as is the case for indium in silicon). However, the species x is relatively distant from the valence band when compared to the value kT. Therefore, species x is only partially ionized, the center of the waveguide is only lightly doped.

The structure also includes a modulator circuit 110 which is electrically connected to the two heavily doped regions through appropriate contacts and which applies a variable bias across the optical modulator structure.

Figure 12A:
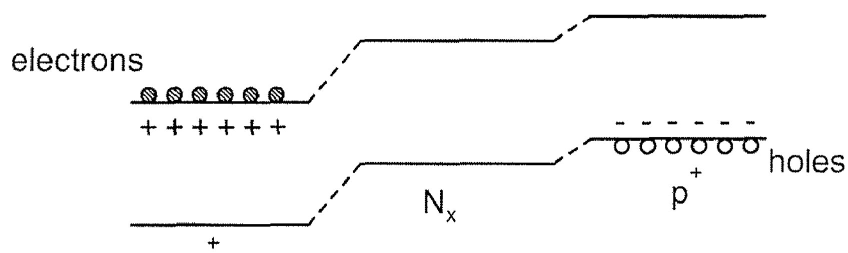
FIGS. 12*a* and 12*b* show bandgap diagrams of the depletion device of FIG. 11 under no bias and reverse bias, respectively.

At zero bias, the center region containing species x has minimal depletion. The majority of x centers retain a neutral charge, which leads to large optical absorption at the targeted wavelength. This is a direct result of electrons being allowed to be excited from the valence band to the center. The equivalent band diagram is shown in FIG. 12*a*.

Figure 12B:
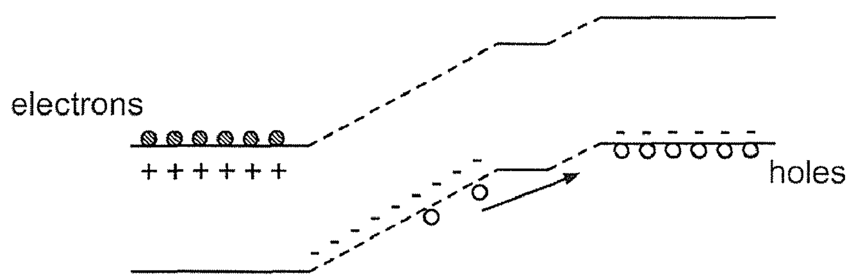

At reverse bias, when the n-type region is biased more positively than the p-type region by modulator circuit 110, the depletion region extends into center of device. Thus, holes are ejected from the space-charge region, leaving negatively charged x centers, as illustrated by the band diagram shown in FIG. 12*b*. These centers are incapable of absorption at the targeted wavelength when in the negative charge state, so the optical absorption is reduced.

One can readily see that by modulating the applied voltage across the optical modulator, one can thereby modulate the strength of an optical signal that is passing through the waveguide between the two heavily doped regions of the optical modulator.

Injection Device

Figure 13:
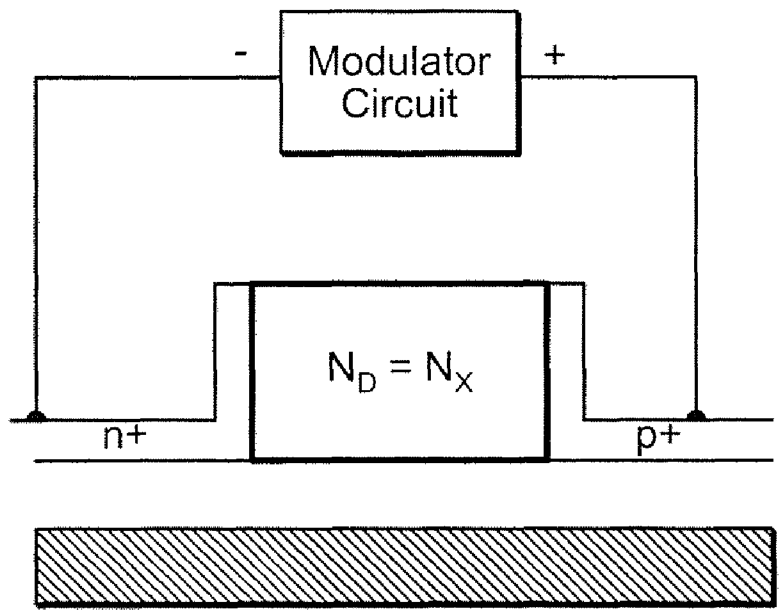
FIG. 13 illustrates a circuit including an injection device.

The injection device, which is depicted in FIG. 13, has the same general structure as that described in connection with the depletion device. However, in this case, the center region is doped with species x to a concentration $N_x$, but is also co-doped with shallow donors (for example phosphorus in silicon) of concentration $N_D$. The concentrations are closely matched such that $N_x=N_D$.

Figure 14A:
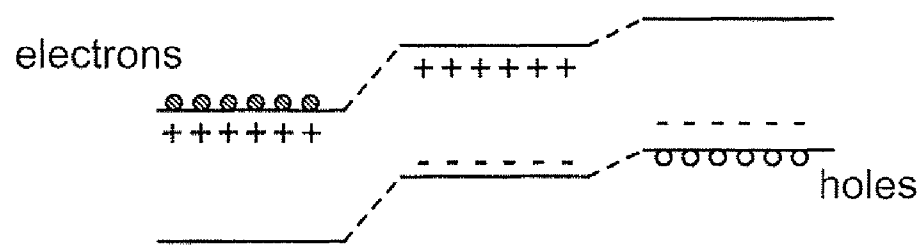
FIGS. 14*a* and 14*b* show bandgap diagrams of the injection device of FIG. 13 under no bias and forward bias, respectively.

Under zero bias, the x centers are compensated by the shallow donors (i.e. electrons supplied by donor atoms are captured by the x centers under thermal equilibrium conditions). Thus, the majority of x centers are negatively charged, and the center region is electrically intrinsic, as depicted in the band diagram shown in FIG. 14*a*. The negatively charged x centers lead to negligible optical absorption at the targeted wavelength.

Figure 14B:
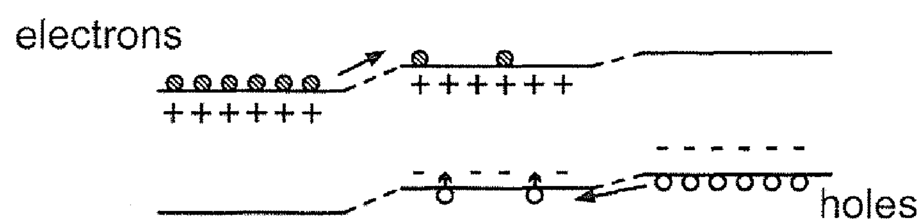

Under forward bias (i.e., the p-type region biased more positively than the n-type region), electrons and holes are injected into the center region. The holes are preferentially captured by species x (due to its closer proximity to the valence band than the conduction band), which neutralizes the x center. This is depicted in the band diagram shown FIG. 14*b*. The net neutralization of x centers leads to an increase in optical absorption.

Again, one can readily see that by modulating the applied forward bias across the optical modulator, one can thereby modulate the strength of an optical signal that is passing through the waveguide between the two heavily doped regions of the optical modulator.

Other embodiments are within the following claims. For example, the mechanism described herein will work with other combinations of a semiconductor waveguide and a deep-level impurity (e.g. greater than about 100 meV from either the conduction or valence band). It helps if the deep level impurity has a high solid solubility in the semiconductor and is asymmetric either in its relation to the conduction or valence band or is asymmetric with regard to the efficiency of excitation from either valence band to deep-level and the excitation from the deep-level to the conduction band. Other examples, of semiconductor material include, without limitation, Ge, SiGe, GaAs, and InP. Other examples of deep level impurities include, without limitation, thallium, zinc, iron tin, and sulphur.

In addition to chemical deep-level impurities, one can also use point defects such as the divacancy, which also has an electronic level located in the bandgap.

Structures other than a ridge waveguide can also be used. For example, one could also use a trench-type structure of the type described in U.S. Pat. No. 7,151,881 (the contents of which are incorporated herein by reference) in which the doped regions are vertically arranged on either side of the optical path of the waveguide.

What is claimed is:

1. A circuit comprising:

an optical waveguide made of a semiconductor material;

a variable optical attenuator formed over a predefined region of the optical waveguide; and a modulating circuit electrically connected to the variable optical attenuator, said variable optical attenuator comprising:

a p-type region on one side of the optical waveguide;

an n-type region on another side of the optical waveguide and aligned with the p-type region; and a deep level impurity doping the semiconductor material in the optical waveguide in a region that is between the p-type region and the n-type region, said deep level impurity creating states in a bandgap in the semiconductor material, wherein said modulating circuit during operation applies a modulated voltage across the variable optical attenuator to thereby control an occupancy of the deep level states created by the deep level impurity.

2. The circuit of claim 1, further comprising a substrate on which the optical waveguide is fabricated and wherein the optical waveguide is a ridge waveguide.

3. The circuit of claim 1, wherein the optical modulator further comprises a co-dopant in the optical waveguide in a region that is between the p-type region and the n-type region, said co-dopant increasing the occupancy of the deep level states.

4. The circuit of claim 1, wherein the modulating circuit is configured to modulate a reverse bias across the variable optical modulator.

5. The circuit of claim 1, wherein the modulating circuit is configured to modulate a forward bias across the variable optical modulator.

6. The circuit of claim 1, wherein deep level impurity comprises indium.

7. The circuit of claim 1, wherein the semiconductor comprises silicon.

8. The circuit of claim 3, wherein the deep level impurity comprises a p-type dopant and the co-dopant comprises an n-type dopant.

9. The circuit of claim 3, wherein the deep level impurity comprises indium and the co-dopant comprises phosphorous.

10. A circuit comprising:

an optical waveguide made of a semiconductor material;

a p-type region on one side of the optical waveguide;

an n-type region on another side of the optical waveguide and aligned with the p-type region;

a deep level impurity doping the semiconductor material in the optical waveguide in a region that is between the p-type region and the n-type region, said deep level impurity creating deep level states in a bandgap in the semiconductor material; and a modulating circuit electrically connected to p-type and n-type regions to modulate a bias between the p-type and n-type regions thereby controlling an occupancy of the deep level states created by the deep level impurity.

11. The circuit of claim 10, further comprising a substrate on which the optical waveguide is fabricated and wherein the optical waveguide is a ridge waveguide.

12. The circuit of claim 10, wherein the circuit further comprises a co-dopant in the optical waveguide in a region that is between the p-type region and the n-type region, said co-dopant increasing the occupancy of the deep level states.

13. The circuit of claim 10, wherein the modulating circuit is configured to modulate a forward bias between the p-type region and the n-type region.

14. The circuit of claim 10, wherein the modulating circuit is configured to modulate a reverse bias between the p-type region and the n-type region.

15. The circuit of claim 1, wherein deep level impurity comprises indium.

16. The circuit of claim 1, wherein the semiconductor comprises silicon.

17. A method comprising:

providing an optical waveguide made of a semiconductor material and having a region that is doped by a deep level impurity, said deep level impurity creating deep level states in a bandgap in the semiconductor material, said deep level states characterized by an occupancy;

passing an optical signal through the optical waveguide and between the region doped by the deep level impurity; and modulating the occupancy of the deep level states to thereby modulate the optical signal.

18. The method of claim 17, wherein modulating involves injecting free-carriers into the region doped by the deep level impurity.

19. The method of claim 17, wherein modulating involves depleting free-carriers from the region doped by the deep level impurity.

20. The method of claim 17, wherein modulating comprises applying a variable forward bias voltage between the p-type region and the n-type region.

21. The method of claim 17, wherein modulating comprises applying a variable reverse bias voltage between the p-type region and the n-type region.

* * * * *